July 24, 1956 R. G. CUNNINGHAM 2,755,888
CLOSED CIRCUIT LUBRICATION SYSTEM
Filed Dec. 22, 1953
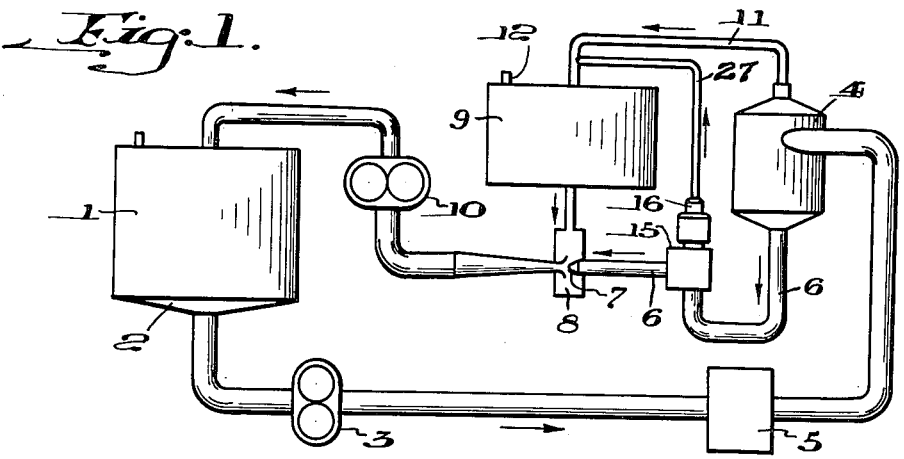
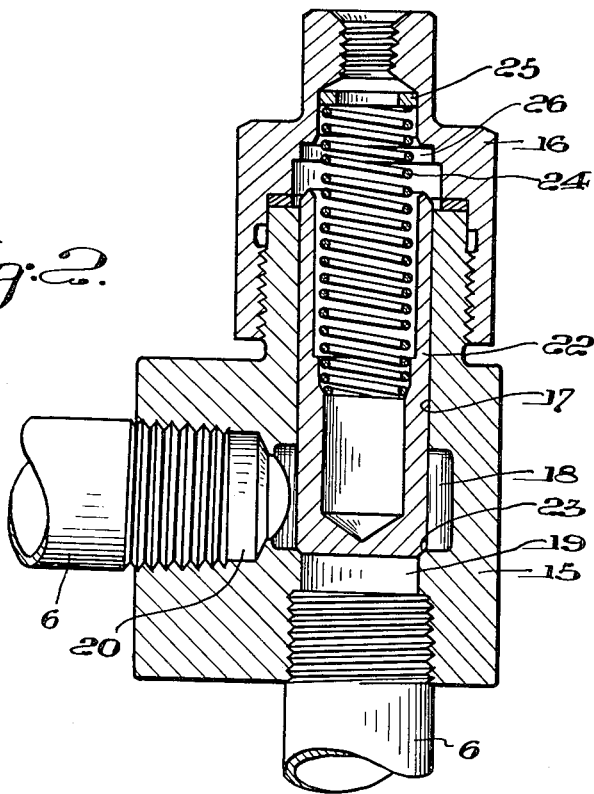
INVENTOR.
RICHARD G. CUNNINGHAM
BY
Brown, Critchlow, Flick & Peckham
his ATTORNEYS.

United States Patent Office 2,755,888
Patented July 24, 1956

2,755,888

CLOSED CIRCUIT LUBRICATION SYSTEM

Richard G. Cunningham, State College, Pa., assignor, by mesne assignments, to Research Corporation, New York, N. Y., a corporation of New York Application December 22, 1953, Serial No. 399,801

4 Claims. (Cl. 184—6)

This invention relates to closed-circuit lubrication systems for internal combustion engines, and more particularly to the priming of such a system when it contains little or no oil.

In a closed-circuit lubrication system, lubricating oil from the sump of the engine generally is delivered by a scavenge pump to a deaerator, where the oil and entrained air are separated, the air being vented at the top of the deaerator and the oil returned to the engine. The air and oil drag from the deaerator vent are delivered to an oil reservoir which has a vent for escape of the air. The main body of oil leaving the bottom of the deaerator passes through a conduit to the inlet nozzle of an eductor on its way to the pressure pump that pumps it back into the engine. The bottom of the reservoir is connected with the side inlet of the eductor so that oil from the reservoir will be drawn into the eductor to make up for the oil escaping through the deaerator vent and for any oil lost through leakage, evaporation, etc.

Before the initial start of a new engine, and before the first start of an engine after the lubricating oil has been drained from it, the lubricating system contains little or no oil although the oil reservoir is full. Therefore, the pressure pump first acts as an air blower, reducing the pressure at its inlet and thus drawing air through the eductor's inlet nozzle from the deaerator and scavenge pump. This air prevents the pressure pump from creating a vacuum, which is needed for drawing oil from the reservoir through the eductor to the pressure pump. Consequently, the lubricating system will not prime and fill with oil. Even if the eductor receives oil from the reservoir by gravity feed, the rate of filling of the system is likely to require a dangerously extended period of engine operation without adequate oil flow to the bearings and gears.

It is among the objects of this invention to provide an engine lubricating oil circulation system which will prime itself automatically, and which will do so quickly before the engine can be harmed by lack of lubrication.

In accordance with this invention, the lubrication system includes a pressure pump for delivering oil to an engine, an eductor having its outlet connected with the pump, a scavenge pump having its inlet connected with the engine, a conduit for conducting oil from the scavenge pump to the eductor to operate it, an oil reservoir connected with the induction inlet of the eductor, and a starting valve in the conduit between the scavenge pump and eductor. The valve has an oil passage through it which is controlled by a plunger that has its front end movable against the pressure of oil from the scavenge pump for closing the passage. The opposite end of the plunger is vented to the atmosphere. A spring normally holds the plunger in passage-closing position to prevent flow of air or oil through the conduit to the eductor until the oil pressure against the inner end of the plunger becomes great enough to unseat it and open the valve passage. Consequently, as long as the valve is closed, the inlet to the eductor is closed and the pressure pump cannot draw air through the eductor. The result is that the pump draws oil through the eductor from the reservoir to fill the lubrication system rapidly. The scavenge pump returns the oil through the conduit connected to its outlet and increases the pressure against the front end of the valve plunger until the plunger is forced back and the passage through the valve is opened to establish closed-circuit flow.

The preferred embodiment of the invention is illustrated in the accompanying drawings, in which Fig. 1 is a diagram of my oil well circulation system; and Fig. 2 is an enlarged central longitudinal section through the starting valve.

Referring to Fig. 1 of the drawings, in normal operation of an internal combustion engine 1 provided with a closed-circuit lubrication system, lubricating oil is withdrawn from the sump 2 by means of one or more scavenge pumps 3 which pump the oil into a deaerator 4. An oil cooler 5 is placed at a suitable location in the line, such as between the scavenge pump and deaerator. The deaerated oil leaves the bottom of the deaerator through a conduit 6 which leads to the inlet nozzle 7 of an eductor 8. The pressure created by the scavenge pump therefore operates the eductor. The side or induction inlet of the eductor is connected with the outlet of an oil reservoir 9. The outlet of the eductor is connected with the inlet of a pressure pump 10 which pumps the deaerated oil back into the engine to lubricate its moving parts. The air separated from the oil in the deaerator leaves it through a vent in its top and is conducted through a pipe 11 to the top of the oil reservoir, from which it can escape to the atmosphere through a vent 12. In order to be sure that all of the air is being conducted away from the deaerator, a small percentage of oil always is withdrawn with it.

In such a system the oil is continuously circulated and deaerated. However, when the engine is started in operation for the first time, or when it is started the first time after oil has been drained from the lubricating system for replacement by fresh oil, the problem arises as to how to prime or fill the system with oil quickly before the engine is damaged by lack of lubrication. With the lubricating system described thus far, the pressure pump 10 would act as an air blower and draw air through the rest of the system so that little or no oil would enter from the reservoir. Although in Fig. 1 the reservoir appears to be above the eductor, it is to be understood that this is only a schematic showing and that actually the induction inlet of the eductor may be above the oil level in the reservoir. In such a case, air drawn through the eductor inlet nozzle will prevent the eductor from sucking oil up out of the reservoir. Even if the reservoir is above the eductor, however, gravity flow of oil into the eductor cannot be depended upon to fill the lubricating system fast enough to prevent damage to the engine parts that should be lubricated.

It is a feature of this invention that when the empty oil system is first started up, the passage to the eductor's inlet nozzle will be closed so that the low pressure created at the eductor by pressure pump 10 will draw oil rapidly into the system from the reservoir. As soon as the system is filled or nearly filled with oil the eductor inlet nozzle opens automatically. This is accomplished by connecting a priming or starting valve in conduit 6 that leads from the deaerator to the eductor inlet nozzle. As shown in Fig. 2, the housing of the valve consists of a body 15 and a cap 16 screwed onto a threaded projection of the body. The body and its projection are provided with a bore 17 extending therethrough. The bore is enlarged in the body to provide an annular recess 18. The bore between this recess and the end opposite to the cap forms an inlet passage 19 that may be threaded for connection to conduit 6. The valve body at one side of the bore is provided with an outlet passage 20 that opens into one side of recess 18. This passage is connected to the part of conduit 6 connected to the eductor.

For closing inlet passage 19, a plunger 22 is slidably mounted in bore 17 beyond the inlet and normally extends through recess 18 with its front end engaging seat 23 at the inner end of the inlet passage. The plunger is held against this seat by a coil spring 24 that is inside of the hollow plunger and that extends out of its rear end and into engagement with a ring 25 mounted in a bore 26 through cap 16. The inner portion of the bore is large enough to permit the plunger to move back into it. Any oil leaking back past the plunger can be returned to the reservoir through a tube 27. Even though this tube is used, the back of the plunger is vented to the atmosphere because the reservoir is under atmospheric pressure.

In order to prime the empty lubricating system with fresh oil, the pumps are started in operation, but pressure pump 10 first acts as an air blower and thereby reduces the pressure in the eductor. Since conduit 6 is closed by valve plunger 22, the lowered pressure in the eductor causes oil from the reservoir to flow into the side of the eductor at once and be delivered to the pump. This oil passes through the engine where it lubricates the moving parts, and then is pumped from the sump around through the cooler and deaerator by means of the scavenge pump. When enough oil has accumulated in the system between the scavenge pump and starting valve to overcome the resistance of valve spring 24, the oil pressure will push the plunger back off its seat 23 and thereby open the passage through the valve from inlet 19 to outlet 20. From then on, as long as the engine is running, oil will flow through the valve to the eductor.

The opening pressure for the valve may be anything desired, although a pressure between one and four pounds per square inch should be satisfactory. An advantage of this particular valve is that opening of the valve is independent of the pressure depression at the valve outlet caused by the pressure pump during priming. To hold the plunger in open position, only a predetermined line pressure between the deaerator and eductor is required, not a direct pressure drop across the valve of the same magnitude. That is, the pressure at the outlet of the valve has no effect on the pressure required to open the valve and maintain it open, so it is unnecessary for the scavenge pump to attempt to maintain a certain pressure drop across the valve. This is especially important where an aircraft engine is concerned and is being flown at a high altitude where a small pressure loss across the valve is very beneficial. On the other hand, an opening pressure of several pounds per square inch is desirable.

A secondary advantage of this system is the action of the starting valve when an aircraft engine is subjected to transient conditions, such as inverted flight. Such conditions frequently disrupt flow from the scavenge pump and hence to the pressure pump. With the starting valve disclosed herein closing under those conditions, the system, in effect, converts itself into a conventional open circuit system which permits the pressure pump to draw oil momentarily directly from the oil reservoir so that continued oil flow will be assured.

The drain line 27 from the valve vent to the reservoir may be eliminated by sealing the inner end of the plunger to the valve body by means of a flexible bellows that will prevent oil from escaping from around the rear end of the plunger.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A self-priming closed-circuit lubrication system for internal combustion engines, comprising a pump for delivering oil to an engine, an eductor having its outlet connected with the pump inlet, means for pumping oil from the engine, a conduit for conducting oil from said means to the eductor to operate it during normal operation of the system, an oil reservoir having an outlet in communication with the induction inlet of the eductor, a valve housing in said conduit having an oil passage therethrough, a plunger in said housing having a front end movable against the pressure of oil from said pumping means for closing the passage, the opposite end of the plunger being vented to the atmosphere, and a spring normally holding the plunger in passage-closing position to prevent flow through said conduit to the eductor until the oil pressure against the front end of the plunger becomes great enough to overcome the resistance of the spring, whereby when the system needs priming said passage will remain closed until enough oil from said reservoir has been drawn through the eductor into the system to open said valve passage.

2. A lubrication system in accordance with claim 1, including a deaerator in said conduit between said pumping means and valve housing.

3. A lubrication system in accordance with claim 1, in which the inlet portion of said valve housing passage is in axial alignment with said plunger, and the outlet portion of the passage extends laterally from the plunger.

4. A self-priming closed-circuit lubrication system for internal combustion engines, comprising a pump for delivering oil to an engine, an eductor having its outlet connected with the pump inlet, means for pumping oil from the engine, a conduit for conducting oil from said means to the eductor to operate it during normal operation of the system, an oil reservoir vented to the atmosphere and having an outlet in communication with the induction inlet of the eductor, a valve housing in said conduit having an oil passage therethrough, a plunger in said housing having a front end movable against the pressure of oil from said pumping means for closing the passage, the housing having a vent communicating with the rear end of the plunger, a pipe connecting said housing vent with the reservoir, and a spring normally holding the plunger in passage-closing position to prevent flow through said conduit to the eductor until the oil pressure against the front end of the plunger becomes great enough to overcome the resistance of the spring, whereby when the system needs priming said passage will remain closed until enough oil from said reservoir has been drawn through the eductor into the system to open said valve passage.

References Cited in the file of this patent

UNITED STATES PATENTS

| 2,432,130 | Serrell | Dec. 9, 1947 |

FOREIGN PATENTS

| 880,952 | France | Jan. 11, 1943 |
| 982,533 | France | Jan. 31, 1951 |